United States Patent Office 3,143,650
Patented Aug. 4, 1964

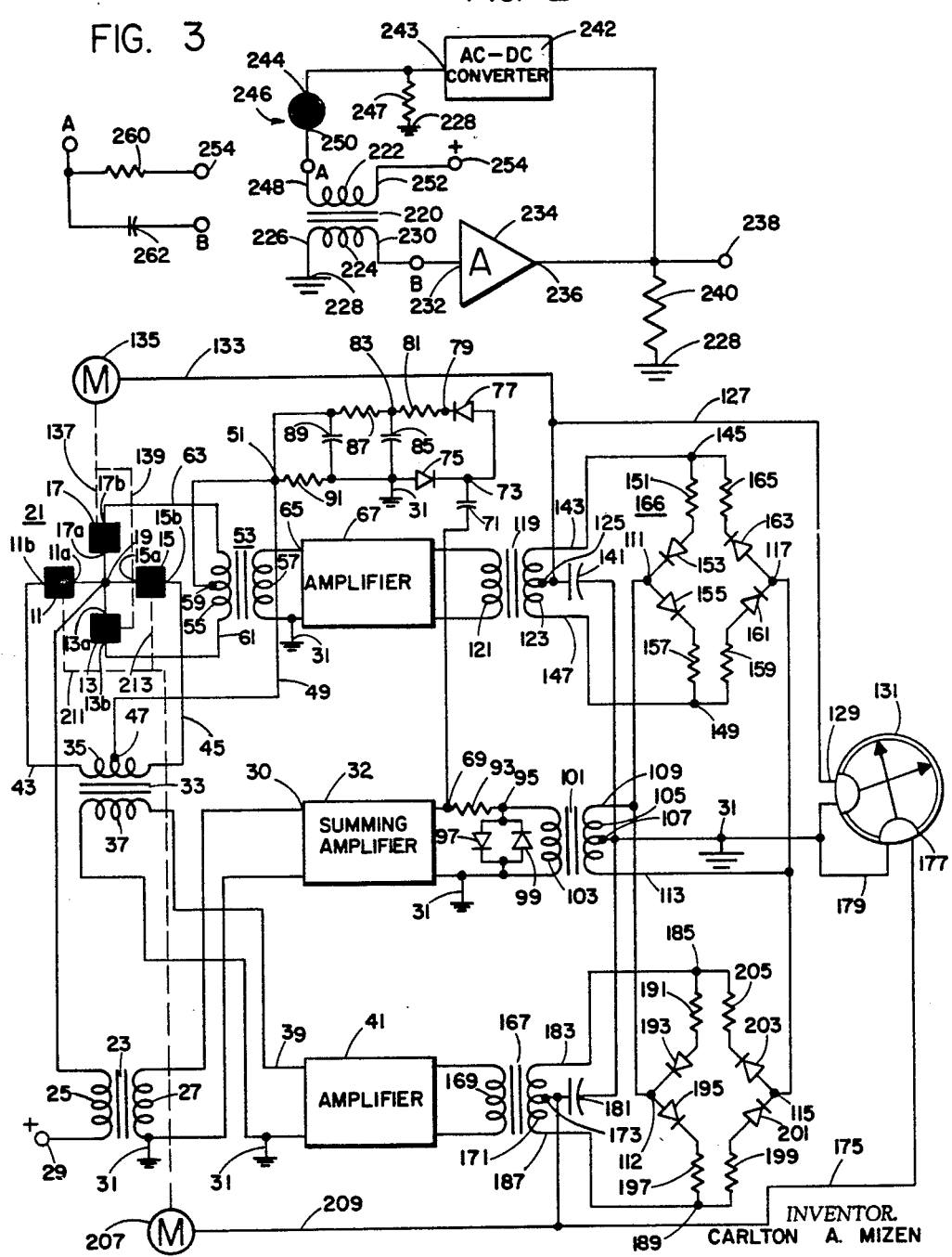

3,143,650
RADIATION DETECTION APPARATUS WITH MEANS TO OBTAIN SUBSTANTIALLY CONSTANT OUTPUT SIGNAL WITH WIDELY VARYING INPUT SIGNALS
Carlton A. Mizen, Minneapolis, Minn., assignor to Minneapolis-Honeywell Regulator Company, Minneapolis, Minn., a corporation of Delaware
Filed Apr. 16, 1962, Ser. No. 187,711
14 Claims. (Cl. 250—83.3)

This invention pertains generally to amplifier feedback control and detection apparatus and more specifically to apparatus to obtain a nearly constant output signal with widely varying input signal strengths.

In order to detect infrared signals which may vary in intensity from that provided by a source several miles away to that provided at a distance of a few feet, an amplifier must be designed such that it will give adequate output at the far distances of detection and still not saturate or overdrive the load when the radiation being detected has approached to a short distance from the detection apparatus. The apparatus hereinafter described not only provides indications of where a radiation producing device is located with respect to centralized axes between two or four infrared detectors but it also provides means whereby the output signal is maintained at a fairly constant level, with respect to the input, even though the input radiation varies greatly in magnitude at the receiving detectors. This is advantageous in that less complex amplifiers and associated electronics can be used to thereby reduce cost and weight, both of which are of considerable importance in any practical design.

It is an object of this invention to provide an amplifier with a type of feedback whereby the output remains relatively constant with respect to a changing input.

Another object of this invention is to provide a teaching for locating infrared sources.

Other general and specific objects of this invention will become apparent from a reading of the following specification and appended claims in conjunction with the accompanying drawings of which:

FIGURE 1 is a combined circuit and block diagram of the entire detector and indicating system;

FIGURE 2 is a schematic of one embodiment of the basic feedback unit utilizing an infrared sensor in the feedback loop; and FIGURE 3 illustrates an insertion for FIGURE 2 for another embodiment whereby the transformer of FIGURE 2 may be eliminated if a transformer is undesirable for one reason or another.

In FIGURE 1 four infrared sensing, radiation sensing, or detecting means 11, 13, 15, and 17 are connected from a first or input connection designated as 11a, 13a, 15a, and 17a respectively to a common junction point 19. The four sensors are generally designated as a sensing unit 21. These sensors may be of a standard thermistor bolometer type wherein radiation received thereby causes changes in the resistance of the bolometers, although other type sensors such as resistive sensors or photoemissive cells may be employed.

Sensors 11, 13, 15, and 17 are arranged as shown so that a reference line perpendicular to the plane of the paper generally points in the direction from which radiation is to be received. Optical means (not shown) are employed to cause infrared radiation from a source to be focused in such a way that a circle of radiation falls on the sensors in equal amounts when the reference line points directly at the source. Before reaching the sensor the radiation is chopped so that it falls in pulses on the sensor. Any change in the relative orientation of the sensors and the source causes the circles of radiation to move thereby exposing one or more of the sensors to greater amounts of radiation while exposing the other sensors to lesser amounts of radiation. The resistance of the sensors thereby changes to provide the system with a signal indicative of the change in relative orientation. This signal may be utilized by the system to be described for purposes of controlling the position of the sensors to re-establish the reference line in the position pointing at the infrared source or for purposes of indicating the deviation from the normal orientation on an appropriate indicator.

A transformer 23 with a primary winding 25 and a secondary winding 27 has one lead of the primary winding 25 connected to a power terminal 29 which in the application shown happens to be positive with respect to ground. The other end of the primary winding is connected to the common junction point 19. The secondary winding 27 of the transformer 23 is connected to signal and ground inputs 30 and 31 respectively of a summing amplifier 32. A transformer 33 with a center tapped primary winding 35 and a secondary winding 37 has one lead of its secondary winding 37 connected to the signal input side 39 and the other lead connected to the ground side 31 of a differential amplifier 41. One end 43 of the primary winding 35 of transformer 33 is connected to a second connection means or output means 11b of the sensing means 11. The other end 45 of the primary winding 35 is connected to a second connection means or output means 15b of the sensing means 15. A center tap 47 of the primary winding 35 is connected by a lead 49 to a junction point 51. A transformer 53 with a center tapped primary winding 55 and a secondary winding 57 has its center tap 59 connected to the junction point 51. One end of the winding 55 is connected to a second connection means or output means 13b of the sensor 13 by a lead 61. The other end of the primary winding 55 is connected by a lead 63 to a second connection means or output means 17b of the sensing means 17. The secondary winding 57 has one end connected to an input 65 of a differential amplifier 67 while the other end is connected to ground 31 and to the ground connection of amplifier 67. A signal output of summing amplifier 32 is connected to a junction point 69. A capacitor 71 is connected between the junction point 69 and a junction point 73. A diode means 75 is connected between ground 31 and the junction point 73. A diode means 77 is connected between the junction point 73 and a junction point 79. A resistive element 81 is connected between a junction point 83 and the junction point 79. A capacitive element 85 is connected between the junction points 83 and ground 31. A resistive element 87 is connected between the junction point 51 and the junction point 83. A capacitive element 89 and a resistive element 91 are connected in parallel between the junction point 51 and ground 31. In this specification diode means and rectifying elements or means are to be considered synonymous and will be called diode means for clarity. Also capacitive means or elements and capacitors are to be considered synonymous. Resistance or resistive means can often be impedance means such as an inductance or possibly a capacitance in some applications but will be referred to as resistive means or elements throughout the specification for clarity. The diode means 75 and 77 along with the capacitors 85 and 89 and the resistive means 81 and 87 constitute a voltage doubling network. The diode means 75 is connected to provide the direction of easy current flow from ground 31 towards junction point 73 while diode means 77 is connected to provide easy current flow from junction point 73 toward junction point 79. A resistive element 93 is connected between the junction point 69 and a junction point 95. Diode means 97 and 99 are connected between the junction point 95 and ground 31 in a parallel manner to provide a clipping action for both polarities of output signal from the summing amplifier 32 to the components driven by transformer 101. In other words, the parallel diode means 97 and 99 are connected such that the direction of easy current flow is opposite for one with respect to the other. The phase reference transformer 101 has a primary winding 103 connected between the junction point 95 and ground 31 and has a center tapped secondary winding 105. A center tap 107 of winding 105 of transformer 101 is connected to ground 31. One end 109 of the secondary winding 105 is connected to junction points 111 and 112 while the other end 113 of the secondary winding 105 is connected to junction points 115 and 117. A transformer 119 has a primary winding 121 connected across the output of amplifier 67 and has a secondary winding 123 with a center tap 125 connected to a lead 127. The lead 127 also is connected to an input 129 of an indicator 131. The center tap 125 is also connected by a lead 133 to a motor 135 which is connected to a reference supply (not shown). The motor 135 is mechanically connected to the sensing elements 13 and 17 as shown by the dashed lines representing mechanical connections 137 and 139. A capacitive element 141 is connected between the center tap 125 and ground 31. One end 143 of the secondary winding 123 is connected to a junction point 145. The other end 147 of the secondary winding 123 is connected to a junction point 149. A resistive element 151 and a diode means 153 are connected in series between the junction point 145 and the junction point 111 to provide a direction of easy current flow from the junction 145 toward the junction point 111. A diode means 155 is connected in series with a resistance element 157 between the junction points 111 and 149 to provide a path of easy current flow from the junction point 111 to the junction point 149. A resistance element 159 is connected in series with a diode means 161 between junction points 149 and 117 to provide a direction of easy current flow from the junction point 149 to the junction point 117. A diode means 163 is connected in series with a resistance element 165 to provide a direction of easy current flow from the junction point 117 toward the junction point 145. The entire unit comprising the diode means 153, 155, 161 and 163, along with the resistive elements 151, 157, 159, and 165 provide the main portion of a demodulating or detecting apparatus generally designated as 166. A transformer 167 has a primary winding 169 connected across the output of amplifier 41. A secondary winding 171 of the transformer 167 has a center tap 173 which is connected by a lead 175 to an input 177 of the indicator 131. The indicator 131 is also connected by a lead 179 to ground 31. A capacitive element 181 is connected between the center tap 173 and ground 31. One end 183 of the secondary winding 171 is connected to a junction point 185 and the other end 187 of the secondary winding 171 is connected to a junction point 189. A resistance element 191 is connected in series with a diode means 193 between junction points 185 and 112 to provide easy current flow in a direction from junction point 185 to junction point 112. A diode means 195 is connected in series with a resistance element 197 between and to provide easy current flow from the junction point 112 toward the junction point 189. A resistive element 199 is connected in series with a diode means 201 to provide a direction of easy current flow from junction point 189 toward junction point 115. A diode means 203 is connected in series with a resistance element 205 to provide a direction of easy current flow from the junction point 115 toward the junction point 185. A motor 207 is connected by a lead 209 to the center tap 173 of secondary winding 171 and operates to position the sensors 11 and 15 by means of the mechanical connection shown by dashed lines 211 and 213.

In FIGURE 2 a transformer 220 has a primary winding 222 and a secondary winding 224. One end 226 of the secondary winding 224 is connected to ground 228. The other end 230 of the secondary winding 224 is connected to a junction point B and from there to an input 232 of an amplifier or amplifying means 234. An output 236 of the amplifier 234 is connected to an output terminal 238. A load or resistance means 240 is connected between the output 238 and ground 228. An A.C. to D.C. converter, rectifying means, potential adjusting means, or voltage doubling means 242, hereafter termed converter for clarity, is connected between junction point 238 and a second connection means or output means 244 of an infrared sensor, sensing unit or detecting means 246. A resistance element 247 is connected between an output 243 of converter 242 and ground 228. One end 248 of primary winding 222 of transformer 220 is connected to a junction point A and also to a second connection means or input means 250 of the infrared detector 246. The other end 252 of the winding 222 is connected to a power terminal 254 which in this application happens to be positive.

In FIGURE 3 a resistance element 260 is connected between a junction point A and a power terminal 254. A capacitive element 262 is connected between the junction point A and a junction point B. The power terminal 254 and the junction points A and B are the same as the respective elements in FIGURE 2 and the circuit of FIGURE 3 can be inserted in the apparatus of FIGURE 2 as a replacement for the transformer shown there. FIGURE 3 is merely an illustration that it is not required that a transformer be used in this circuit but that any type of apparatus whereby a signal is applied to the amplifier that is representative of the current flow through the sensing means 246 is useable.

*Operation*

The operation of FIGURE 2 will be explained first as it is believed this will facilitate the explanation of FIGURE 1. Resistive sensing elements such as infrared detectors are voltage sensitive. In other words, the sensor will allow current flow therethrough not only as a function of infrared radiation striking the sensor but also as a function of the voltage applied across the sensor. If the voltage across the sensor 246 is changed as a function of the distance of the source of infrared radiation in that the voltage is decreased as the source of radiation becomes closer, the current flow through the device can remain constant. This is the basis of this invention. The input infrared signal is chopped so that the radiation is received by the sensor 246 for predetermined periods and no signal is received for a predetermined period. Voltage is applied at terminal 254 and current attempts to flow through the primary winding 222 of transformer 220, through the sensor 246 and through the resistance element 247 to ground 228. If radiation, to which the sensor 246 is sensitive, is applied to the sensing element, current will pass through the element 246 in accordance with the voltage between connections 250 and 244. This voltage is a function of the supply voltage applied to 254, the impedance of the winding 222 and any voltage which may be present at the output 243 of the converter 242. When there is no input radiation current flow will be stopped or at least diminished through the sensing element 246. The starting and stopping of inputs produces current pulses in the transformer winding 222. The current pulses are applied by winding 224 to the input 232 of amplifier 234. This input signal is amplified and is applied across the load 240. The output voltage at terminal 238 is detected by the converter 242 and a D.C. output signal is applied to the connection 244 of the sensor 246 in accordance with the amplitude of the signal appearing at 238. As the source of radiation becomes closer, the sensor 246 attempts to pass more current and thereby produce a bigger current pulse in the transformer 220. This attempt to increase the size of the current pulse is amplified by the amplifier 234 and detected and changed to a D.C. voltage by the converter 242 to increase the voltage at the output 243 of the converter and thereby reduce the effective voltage applied across the sensor 246. The current flow through the sensor 246 will therefore decrease to a value only slightly higher than it was when the source of radiation was farther away. It will be noted that current through the sensing element 246 does increase slightly as the source of radiation is moved closer and therefore the signal appearing at the output terminal 238 is also increased slightly. However, the increase in output signal is much less than the change in current in the sensing element 246 would be without this method of feedback. The output for the purposes of this specification may be defined as nearly or relatively constant or stable even though the output does increase a small amount with a large change in input. Since the intensity of light radiation varies as the square of the distance it can be appreciated that there will be a great change in intensity of radiation as a source is moved from a point several miles away to a point only a few feet away from the receiving sensor. An an example, if the radiation source is moved from 1000 feet to 3 feet from the sensor 246, the intensity will change approximately 1 to 100,000 while the output signal will change from about 0.1 volt to about 10 volts or a change of 100. The input thus changes 1000 times as much as the output. It will also be appreciated that the converter 242 may be rectifying and amplifying and that the more amplification in unit 242, the more nearly constant will be the output signal at terminal 238. Utilizing the invention described in FIGURE 2 this great variation in intensity can be utilized without complex and completely unnecessary circuitry for some applications. One such application will be described in connection with FIGURE 1.

The object of the circuitry in FIGURE 1 is to provide signals indicating the relative position of a source of infrared radiation with respect to a reference axis defined as a line, all points of which are situated equidistant from the four sensing elements generally described as 21, to reposition the sensing elements 21 such that the reference axis is always changing toward the source of radiation, or to do both simultaneously. Ideally, the source of radiation which is focused in many applications to a rather limited spot will fall equally on each of the four sensors when the reference axis is pointing directly at the source of radiation and therefore the differential amplifiers 41 and 67 will receive no input signals from the set of sensors to which they are connected. If, however, the source of radiation is moved from the reference axis such that more radiation is applied to sensing element 17 than is applied to sensing element 13, the transformer 53 will provide a signal to the amplifier 67. Current will flow from the power terminal 29 through the primary winding 25 of transformer 23, the sensing elements 13 and 17, to ground 31 through the primary winding 55 of transformer 53 and resistive element 91. Since it is assumed more radiation is striking sensing elements 17, more current will flow through that sensor that will flow through sensor 13 and therefore through the top half of the primary winding 55 more current will flow than will flow through the bottom half of the winding. With this type of transformer, no output signal will be obtained as long as the current flow is equal in the two halves of the winding. Since in this case, the current flow in the top half is greater than the current flow in the bottom half, an output signal will be obtained at the winding 57 and applied to the amplifier 67. As will be noted, the current flow through the primary winding 25 is the sum of currents flowing through the four resistive sensors 11, 13, 15, and 17, and this accounts for the designation "summing amplifier" applied to component 32. The function of the summing channel is two-fold. First it provides a signal phase reference with which the position sensitive phase of the differential amplifiers 41 and 67 may be compared. Secondly, it utilizes the total radiation strength being received by the sensing unit 21 to establish the voltage being applied across the sensing unit 21 as described in FIGURE 1 for sensor 246. The reference signal and the signal appearing on secondary winding 57 is either in phase or 180° out of phase with the reference signal at winding 27. The phase of the signal appearing at secondary winding 57 with respect to that appearing at winding 27 will depend on the sensing element receiving the most light and the manner in which it is connected to the primary winding 55 of the transformer 53. The output of summing amplifier 32 is applied through transformer 101 across the terminals 111 and 117 of the diode bridge utilizing diodes 153, 155, 161, and 163. The diodes 97 and 99 clip the signal being applied to transformer 101 and provide a square wave signal across junction points 111 and 117 establishing phase reference. It may be assumed that, when more light is applied to sensor 17, junction point 145 becomes positive with respect to junction point 149 at the same time that junction point 111 becomes positive with respect to junction point 117. Current will flow from junction point 111 through the diode and resistor combination 155 and 157 to junction point 149 and from there through resistor 159 and diode 161 to the junction point 117. Resistors 157 and 159 may be made of equal value so that the junction point 149 will be at the same potential as ground 31 which is connected to the center tap of this supply transformer 101. Since it was previously assumed that junction point 145 was positive with respect to junction point 149 it can therefore be seen that center tap 125 is positive with respect to ground and a D.C. output signal is obtained there. This signal is applied to input 129 of the indicator 131 to provide an indication that the source of radiation is not centered at this time. This positive signal is also applied to the motor 135 and the sensing elements 13 and 17 will be repositioned so that the center line between them will point to the infrared source and the indicator 131 will again show that the sensors 21 are pointing in the corrected direction. The same operation will occur if more radiation is received by sensing element 11 than is received by 15 except that amplifier 41 and summing amplifier 32 are involved with the output being applied through the demodulating means utilizing diode means 193, 195, 201, and 203 to the input 177 of the indicating element 131 and to the motor 207 to reposition the sensors 11 and 15.

The feedback action in FIGURE 1 is based on the same principle as shown in FIGURE 2 wherein the summing amplifier 32 is similar to amplifier 234 and the junction point 69 would be similar to output terminel 238 and the resistance 93 along with transformer 101 would be similar to load resistance means 240. The voltage doubling circuit previously mentioned in FIGURE 1 would provide the same function as the converter 242 although it has an additional feature in the capacitance means 71 connecting it to the output of the summing amplifier 32. The resistance means 91 would be similar to the resistance 247. The sensing unit 21 in FIGURE 1 consisting of the four sensors is shown as the single sensor 246 in FIGURE 2 without the intervening transformer primaries 35 and 55. The transformer 23 in FIGURE 1 is that shown as 220 in FIGURE 2. With this comparison it can be determined that the output of the summing amplifier 32 is rectified and increased in voltage in the voltage doubling circuit and applied to the junction point 51 to change the voltage at that point. Current also flows from the terminal 29 through the transformer winding 25 through the "a" connections of the four sensors and out the output connections "b" of the sensors through the primary winding 35 and 55 to the junction point 51. It will therefore be apparent by similarity that the output of the summing amplifier 32 is used to change the voltage across the sensing unit 21 between junction point 19 and 51 to change the sensitivity of the sensing unit 21 as the radiation source moves closer or farther away.

The apparatus of FIGURE 1 does not require changes in amplitude of the output signal. The output is merely being used as a reference in the case of the summing amplifier. The output signals from the amplifiers 41 and 67, while variable, are only attempting to reposition the motors 207 and 135 and the sensors attached thereto to a null condition and it is not important that the output signal vary in amplitude depending on the distance of the source but only in the relation of the source with respect to the reference axis between the set of sensors. The variation in amplitude of signal to drive the motors 135 and 207 may be obtained entirely from the unbalance in signals received by the amplifiers from the pairs of sensors. The same is true of the indicator unit 131 in which the indication is an indication of the relative distance of the source of radiation from the reference axis between the respective sets of sensors.

It is believed that the optional circuit shown in FIGURE 3 to be inserted in FIGURE 2 is self explanatory but brief mention will be made thereof. Current flow is obtained through the resistance 260 and the sensing element 246 to ground through resistor 247. The changes in current flow through sensing element 246 are detected at junction point A by the changes in voltage drop across resistor 260 to thereby provide an input signal to the amplifier 234 through the capacitive element 262. In some instances, where a capacitor is incorporated within the amplifier 234 or where a direct current amplifier is used, it would not even be necessary to utilize the capacitor 262.

While this specification has been described as utilizing infrared sensors it is to be realized that other sensors which are voltage sensitive in their detection may be used and fall within the teachings of this invention. It is also to be realized that it is not necessary to use the particular type of voltage doubler shown herein or that a voltage doubler even need to be used but merely a device which provides an output signal indicative of the output of the amplifier 234 to change the effective voltage across the sensing element such as 246. The amplifier 234 can be a direct current amplifier if desired and the unit 242 would merely be a D.C. to D.C. converter if a change in voltage is necessary. The particular circuitry shown for use in the two demodulating circuits is only representative of one type of demodulator which can be used and that it should be apparent that others can be used equally well.

Other changes and modifications will be apparent to those skilled in the art and still fall within the realms of this invention and I wish to be limited only by the appended claims.

I claim:

1. An infrared detector arrangement comprising in combination:

first, second, third, and fourth detecting means each including first and second connection means, said detecting means each providing an output signal in accordance with infrared signals received;
power supply means;
means connecting said power supply means to said first connection means;
first amplifier means including output means;
means connected to said first and second detecting means and to said first amplifier means to present a differential signal indicative of the difference in amplitude between the output signals from said first and second detecting means to said first amplifier means;
second amplifier means including output means;
means connected to said third and fourth detecting means and to said second amplifier means to present a differential signal indicative of the difference in amplitude between the output signals from said third and fourth detecting means to said second amplifier means;
third amplifier means including output means;
means connecting said first, second, third and fourth detecting means to said third amplifier means to present a signal representative of the total amplitude of the output signals supplied by said first, second, third, and fourth detecting means;
indicating means connected to the output means of said first and second amplifier means to receive signals therefrom and adapted to provide indications representative of said differential signals;
voltage doubling means;
means connected to said voltage doubling means and said third amplifier means to present a signal from said third amplifier means to said voltage doubling means, said voltage doubling means adapted to provide an output signal;
and means connecting said voltage doubling means to each of the second of said connection means to present the output signal of said voltage doubling means thereto.

2. Apparatus of the class described comprising in combination:

first, second, third, and fourth detecting means each including first and second connection means, said detecting means each providing an output signal in accordance with a condition;
power supply means;
means connecting said power supply means to said first connection means;
first amplifier means including output means;
means connected to said first and second detecting means and to said first amplifier means to present a differential signal indicative of the difference in amplitude between the output signals from said first and second detecting means to said first amplifier means;
second amplifier means including output means;
means connected to said third and fourth detecting means and to said second amplifier means to present a differential signal indicative of the difference in amplitude between the output signals from said third and fourth detecting means to said second amplifier means;
third amplifier means including output means;
means connecting said first, second, third and fourth detecting means to said third amplifier means to present a signal representative of the total amplitude of the output signals supplied by said first, second, third, and fourth detecting means;
indicating means connected to the output means of said first and second amplifier means to receive signals therefrom and adapted to provide indications representative of said differential signals;
rectifying means;
means connected to said rectifying means and said third amplifier means to present a signal from said third amplifier means to said rectifying means, said rectifying means being adapted to provide an output signal;
and means connecting said rectifying means to said second connection means of each of said detection means to present the output signal thereto.

3. Infrared apparatus comprising in combination:

first, second, third and fourth infrared sensing means movably mounted on a bearing means;
first and second differential signal producing means connected to two pairs of said sensing means comprising said first and second and said third and fourth sensing means respectively and adapted to give an output signal indicative of difference in currents between the sensing means of each pair;
first amplifier means connected to receive said output signal from said first differential signal producing means and adapted to provide a first output signal indicative of which of said first and second infrared sensing means is providing the greatest signal;

second amplifier means connected to receive said output signal from said second differential signal producing means and adapted to provide a second output signal indicative of which of said third and fourth infrared sensing means is providing the greatest signal;

summing means connected to said first, second, third, and fourth infrared sensing means adapted to provide an output indicative of the sum of the currents through said sensing means;

third amplifier means connected to receive said output signal indicative of a summation of signals provided by said infrared sensing means and adapted to provide a third output signal;

first demodulating means connected to receive said first and third output signals from said first and third amplifier means and adapted to provide a fourth output signal;

second demodulating means connected to receive said second and third output signals from said second and third amplifiers and adapted to provide a fifth output signal;

means connected to receive said fourth and fifth output signals and adapted to orient said bearing means holding said infrared sensing means toward a point where each differential signal producing means will provide minimum output signals;

and indicating means connected to receive said fourth and fifth output signals and adapted to provide outputs indicative of the differential signals from said first and second differential signal producing means.

4. Infrared apparatus comprising in combination:
first, second, third and fourth sensing means each operable to produce a signal indicative of the amount of infrared radiation each receives;

first amplifier means connected to receive the signals from said first and second sensing means and adapted to provide a first output signal indicative of which of said first and second sensing means is providing the greatest signal;

second amplifier means connected to receive the signals from said third and fourth sensing means and adapted to provide a second output signal indicative of which of said third and fourth sensing means is providing the greatest signal;

means connected to said first, second, third and fourth sensing means to produce a signal indicative of the summation of signals therefrom;

third amplifier means connected to said last named means to receive the signal indicative of a summation of signals provided by said sensing means and adapted to provide a third output signal;

demodulating means connected to receive said first, second, and third output signals from said first, second, and third amplifier means and adapted to provide fourth and fifth output signals;

and means connected to receive said fourth and fifth output signals and adapted to reposition said infrared sensing means toward a point where each sensing means will provide equal output signals.

5. Infrared apparatus comprising in combination:
first, second, third and fourth detecting means operable to provide an output signal indicative of a current therethrough;

first amplifier means connected to receive the output signals from said first and second detecting means and adapted to provide a first output signal indicative of which of said first and second infrared sensing means is providing the greatest output signal;

second amplifier means connected to receive the output signals from said third and fourth detecting means and adapted to provide a second output signal indicative of which of said third and fourth detecting means is providing the greatest output signal;

third amplifier means connected to receive an input signal indicative of a summation of output signals provided by said detecting means and adapted to provide a third output signal;

means connected to receive said first, second, and third output signals from said first, second, and third amplifier means and adapted to provide a fourth output signal;

means connecting said third amplifier means to said first, second, third and fourth detecting means for adjusting the current through said detecting means in accordance with the magnitude of said third output signal;

and indicating means connected to receive said fourth output signal and adapted to provide an output indicative of relative signals being obtained from said first and second and from said third and fourth detecting means.

6. In an infrared detector arrangement for providing a relatively constant output signal with large variations in an input, comprising in combination:
first and second infrared detecting means each having first and second connection means and each detecting means being operable to supply an output signal;

means for supplying power connected to said first connection means of each of said infrared detecting means;

amplifier means including output means, connected to receive said signals from said first and second infrared detecting means and adapted to provide an output differential signal indicative of the difference in magnitude between the signals;

summing amplifier means including output means, connected to receive said signals from said detecting means and adapted to provide an output signal representative of the total signals supplied by said infrared detecting means;

indicating means connected to said output means of said amplifier means to receive signals therefrom and adapted to provide an indication responsive to the amplitude of said differential signal;

voltage doubling means connected to receive a signal from said summing amplifier means and adapted to provide an output;

and means connecting the output of said voltage doubling means to said second connection means of each of said infrared detecting means.

7. In an infrared detector arrangement for providing a nearly constant output signal with large variations in an input, comprising in combination:
first and second detecting means each operable to provide output signals;

means for supplying power connected to a first connection means of each of said detecting means;

amplifier means including output means, connected to receive said output signals from said first and second detecting means and adapted to provide a differential output indicative of which detecting means is supplying the most signal;

summing amplifier means including output means, connected to receive said output signals from said detecting means and adapted to provide an output signal representative of the total signals supplied by said infrared detecting means;

signal converting means connected to receive the output signal from said summing amplifier means and adapted to provide an output;

and means connecting the output of said signal converting means to a second connection means of each of said detecting means.

8. Apparatus for use with a pair of sensors which change impedance in accordance with the amount of infrared radiation each sensor receives comprising, in combination:
power supply means connected to each sensor to provide a current flow through each sensor of magnitude dependent upon the resistance of each sensor and the voltage thereacross;

differential current sensing means connected to the sensors and operable to produce an output signal of magnitude indicative of the difference in current flowing through the sensors;

further current sensing means connected to the sensors and operable to produce an output signal of magnitude indicative of the sum of the currents flowing through the sensors;

means connected to said sensors and to said further current sensing means and operable in accordance with the output signal from said further current sensing means to adjust the voltage across each sensor and thereby maintain the current flow through the sensors within predetermined limits;

and means connected to said differential current sensing means operable in accordance with the output signal therefrom to provide an indication indicative of the difference in current between the sensors.

9. Apparatus for providing an indication of the relative orientation between a source of radiation and a body comprising, in combination:

a plurality of radiation sensors each having an impedance which varies in accordance with the amount of radiation received;

means mounting said sensors on the body so that radiation from the source falls on each sensor in an amount which varies with the relative orientation between the source and the body;

power supply means connected to said sensors and operable to produce a signal from each sensor of magnitude which varies with the impedance of the sensor and with the potential thereacross;

means connected to said sensors and operable to provide an indication of the relative magnitudes of the signals from said sensors as an indication of the relative orientation between the source and the body;

and potential adjusting means connected to said sensors and operable in accordance with the sum of the signals from said sensors to adjust the potential across the sensors and maintain the magnitude of signals from the sensors within predetermined limits.

10. Relatively stable output apparatus comprising, in combination:

infrared sensor means including input and output means, said infrared sensor means being dependent in sensitivity on a voltage applied between said input and output means;

resistance means connected at one end to said input means of said infrared sensor means;

means for supplying direct power to the other end of said resistance means;

amplifier means including input and output means;

capacitance means connected between said input means of said infrared sensing means and said input means of said amplifier means;

load means connected between said output means of said amplifier means and a reference potential;

and voltage doubling means connected between said output means of said amplifier means and said output means of said infrared sensor means to change the direct voltage across said infrared sensor means as a function of the strength of an input signal being sensed by said infrared sensor means.

11. Relatively stable output apparatus comprising, in combination:

infrared sensor means including input and output means, said infrared sensor means being dependent in sensitivity on a voltage applied between said input and output means;

transformer means including primary and secondary windings, one end of said secondary winding being connected to said input means of said infrared sensor means;

means for supplying direct power between the other end of said secondary winding and a reference potential;

amplifier means including input and output means;

means connecting said primary winding of said transformer means between said reference potential and said input means of said amplifier means;

load means connected between said output means of said amplifier means and said reference potential;

and voltage doubling means connected between said output means of said amplifier means and said output means of said infrared sensor means to change the direct voltage across said infrared sensor means as a function of the strength of an input signal being sensed by said infrared sensor means.

12. Substantially stable output apparatus comprising, in combination:

sensor means including input and output means, said sensor means being dependent in sensitivity on a voltage applied between said input and output means;

transformer means including primary and secondary windings, one end of said secondary winding being connected to said input means of said sensor means;

means for supplying direct power between the other end of said secondary winding and a reference potential;

amplifier means including input and output means;

means connecting said primary winding of said transformer means between the reference potential and said input means of said amplifier means;

and voltage doubling means connected between said output means of said amplifier means and said output means of said sensor means to change the direct voltage across said sensor means as a function of the strength of an input being sensed by said sensor means.

13. A detecting circuit comprising in combination:

voltage sensitive infrared detecting means having first and second connection means;

means for supplying a voltage, said means being connected to said first connection means;

amplifier means connected to receive a signal from said voltage sensitive infrared detecting means indicative of current flowing therethrough and adapted to provide an output;

means connected to receive said output from said amplifier means and adapted to provide an output voltage indicative of said amplifier output;

means for supplying said output voltage to said second connection means, said voltage sensitive infrared detecting means thereby being supplied with varying voltages thereacross;

and load means for utilizing the output from said amplifier means.

14. A detecting circuit comprising in combination:

detecting means having first and second connection means;

means for supplying a voltage connected to said first connection means;

amplifier means connected to receive a signal from said detecting means indicative of current flowing therethrough and adapted to provide an output;

rectifying means connected to receive said output from said amplifier means and adapted to provide an output voltage indicative of said amplifier output;

and means for supplying said output voltage to said second connection means, said detecting means thereby being supplied with varying voltages thereacross.

References Cited in the file of this patent

UNITED STATES PATENTS

| | | |
|---|---|---|
| 2,828,930 | Herbold | Apr. 1, 1958 |
| 3,038,077 | Gillespie | June 5, 1962 |
| 3,084,253 | McHenry | Apr. 2, 1963 |